T. S. GARRETT.
SHINGLE MACHINE.
APPLICATION FILED DEC. 7, 1914.
1,164,936.
Patented Dec. 21, 1915.
2 SHEETS—SHEET 1.
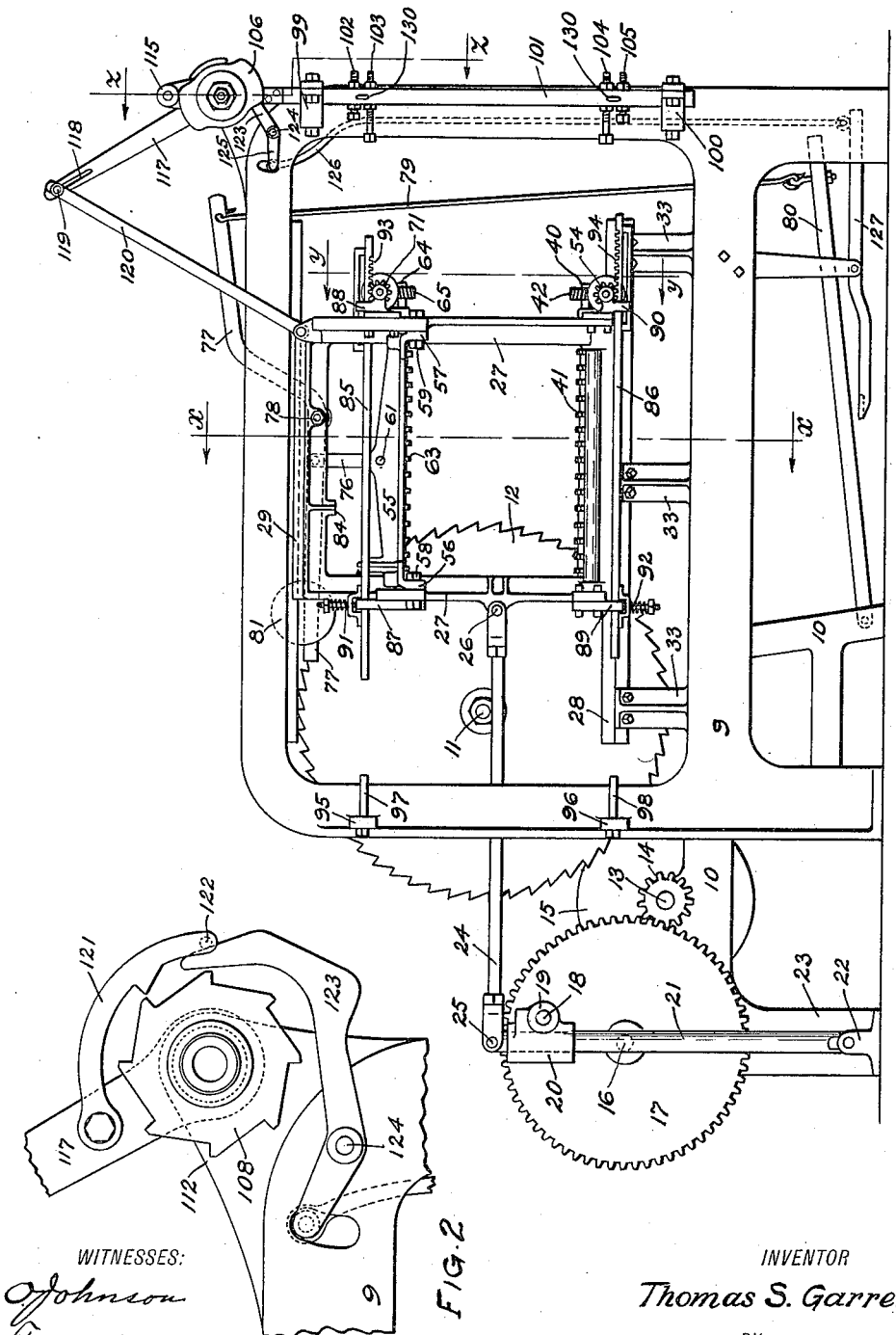
WITNESSES:
O Johnson
Frank Warren
INVENTOR
Thomas S. Garrett
BY
C. D. Haskins
ATTORNEY

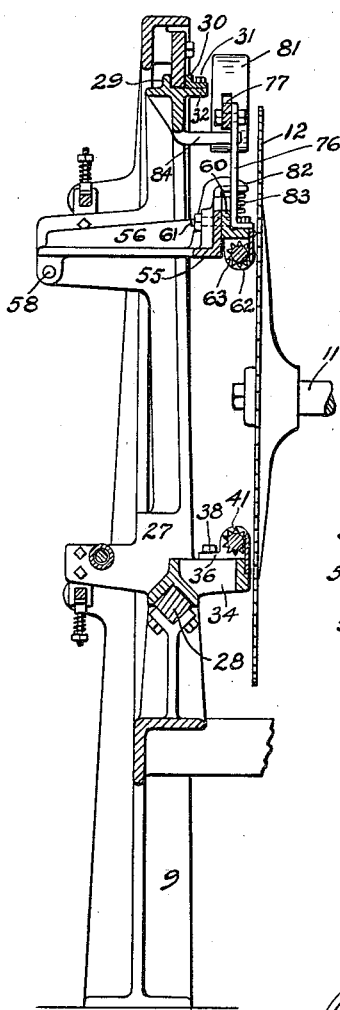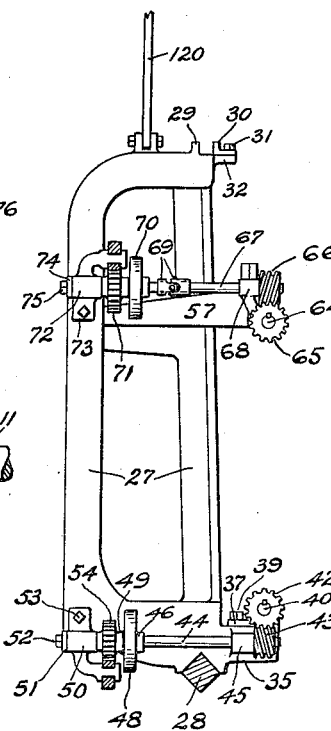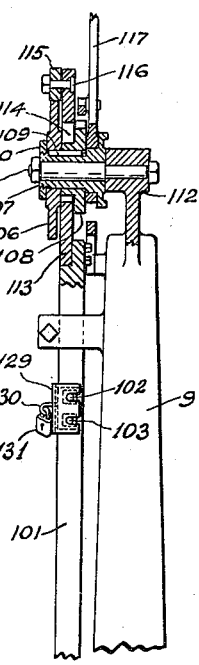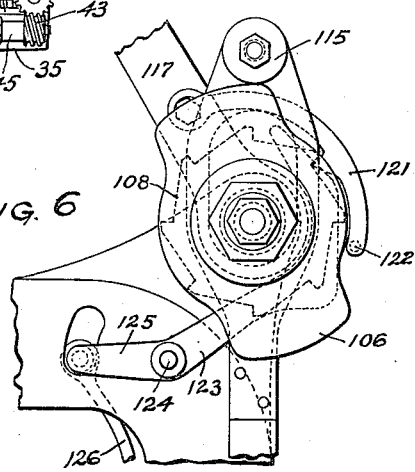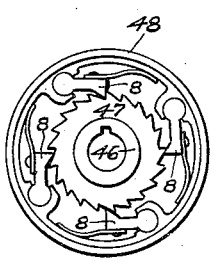

UNITED STATES PATENT OFFICE.

THOMAS S. GARRETT, OF SEATTLE, WASHINGTON.

SHINGLE-MACHINE.

1,164,936.

Specification of Letters Patent. Patented Dec. 21, 1915.

Application filed December 7, 1914. Serial No. 875,806.

*To all whom it may concern:*

Be it known that I, THOMAS S. GARRETT, a citizen of the United States, residing at Seattle, in the county of King and State of Washington, have invented a certain new and useful Improvement in Shingle - Machines, of which the following is a specification.

My invention relates to improvements in machines for sawing shingles, and the object of my improvement is to provide a machine which shall be adapted to saw shingles from a bolt of timber known as a shingle bolt and which shall embody simple and efficient means for gripping a shingle bolt by its end surfaces and moving it in an upright position, step by step, toward a saw that may saw it into shingles, and which, further, is provided with independently adjustable means whereby each end of such shingle bolt may be caused to move toward such saw, at each step, such distance as will set the shingle bolt in position with relation to the saw as will produce a shingle that shall be of a required thickness at each of its ends.

A further object of my invention is to provide such shingle sawing machine with rotatable gripping jaws, whose journals revolve in suitable bearings, and with means for rotating such jaws with ease and precision to move a shingle bolt sidewise toward the saw to a desired fixed position, and a still further object of my invention is to embody in such shingle sawing machine adjustable means for compensating for the wear of its gripping jaws and other parts whereby each of the shingles successively produced shall be always of the required different thicknesses at its ends.

I accomplish these objects by devices illustrated in the accompanying drawings in which—

Figure 1 is a view in front elevation of the principal parts of a shingle machine embodying my invention; Fig. 2 is an enlarged view in side elevation of some details of the same; Fig. 3 is an enlarged view of the same in vertical section on broken line $x$, $x$ of Fig. 1; Fig. 4 is an enlarged view of parts of the same in vertical section on broken line $y$, $y$ of Fig. 1; Fig. 5 is an enlarged view of the same in vertical section on broken line $z$, $z$ of Fig. 1; Fig. 6 is an enlarged view in side elevation of some details of my invention; and Fig. 7, by an enlarged view in side elevation, illustrates some of the internal details of a part of my invention.

Referring to the drawings, throughout which like reference numerals indicate like parts, 9 is a cast-iron frame, whose plane is vertically disposed, with one side of which is mechanically connected a supporting frame 10 which is adapted by suitable means, not shown, to support a rotatable shaft 11 upon which is mounted a circular saw 12 whose plane is parallel with the plane of the vertically disposed frame 9; the supporting frame 10 being further adapted to support in suitable bearings associated therewith a shaft 13 upon which is mounted a pinion 14 and a driving pulley 15, and also such supporting frame 10 is provided with bearings within which are rotatably disposed the journals of a shaft 16, whose end is indicated by a dotted circular line in Fig. 1, and upon such shaft 16 is fixed a gearwheel 17 which meshes with the pinion 14 and projecting from the front side of said gearwheel 17 is crank-pin 18 which is disposed within a bearing 19 provided on a projecting portion of a slidable member 20 that is slidably mounted upon a rod 21 which is pivotally articulated with a bracket 22 that is fixed to a leg 23 of the supporting frame 10, whereby such rod 21 may be caused to oscillate in a plane that is parallel with the plane of said gearwheel 17 in response to a rotation thereof.

The upper end of the rod 21 is articulated to one end portion of a connecting rod 24 by a pivot 25 while the other end of said connecting rod 24 is articulated by a pivot 26 to the nearer side rail of a slidably movable frame 27 of rectangular form whose plane is vertically disposed and whose bottom rail, on its underside, is provided with a V shaped groove whose side surfaces slidably rest upon a supporting guide 28 secured to brackets 33 on the frame 9 whereby such movable frame 27 may be caused to move back and forth on said supporting guide in response to an oscillation of the rod 21 due to a rotation of the gearwheel 17.

The top rail of the frame 27 is provided with a rectangular guiding-groove that extends lengthwise thereof which guiding-groove is formed by an upwardly projecting flange 29 and an adjustable gib 30 which is secured by screw-bolts, like the screw-bolt 31, to a horizontally projecting flange 32, as more clearly shown in Fig. 3, whereby such frame 27 shall be movable only in the same plane.

Extending toward the plane of the saw 12 from each end of the movable frame 27 adjacent to the bottom thereof and integrally therewith is a projecting portion, one of which projecting portions is indicated by the numeral 34 in Fig. 3, and the other of which is indicated by the numeral 35 in Fig. 4, and upon such projecting portions 34 and 35 are bearing blocks 36 and 37, respectively, which are secured by screw-bolts 38 and 39, respectively, and within the bearings of such bearing blocks 36 and 37 are rotatably disposed the journals of the shaft 40 of a spurred roller 41 whose axis is thus disposed parallel with the plane of the saw 12 and which spurred roller 41 comprises one of the rotatable gripping jaws by which a shingle bolt is gripped and carried, step by step, toward the saw 12.

Upon the end of the shaft 40, that is farther from the saw 12, is mounted securely a worm-gear 42 which meshes with a worm-screw 43, as more clearly shown in Fig. 4, which worm-screw 43 is mounted securely on one end of a shaft 44 that is rotatably mounted in a bearing 45 that is integrally attached to the projecting portion 35, while upon the other end of such shaft 44 is mounted the hub 46 of a ratchet wheel 47, which ratchet wheel 47 is disposed within a circular pawl casing 48 whose hub 49 is securely mounted on another shaft which is disposed to rotate within a bearing 50 within which it is secured by a washer 51 and a screw-bolt 52 which screw-bolt 52 is screwed into the end of such other shaft, the bearing 50 being secured to the bottom portion of the vertical end rail of the movable frame 27 by a screw 53, and securely mounted on such other shaft at a point between the hub 49 of the pawl casing 48 and the bracket 50 is a gearwheel 54.

Within the pawl casing 48 and pivotally attached thereto, as shown in Fig. 7, are four pawls 8 which are disposed at equidistant circumferential points and which are adapted in a well known manner to engage with different ones of twenty one teeth which are provided on the ratchet 47, whereby in the coaction of such pawls and ratchet there may be little lost motion. Thus a rotation of the gearwheel 54 in one direction will rotatably move the shaft 44 with its worm-screw 43 to rotate the spurred roller 41 in a direction to carry a shingle bolt toward the saw 12 but a rotation of such gearwheel 54 in an opposite direction will not move the shaft 44.

Disposed to extend horizontally between the vertical side rails of the movable frame 27 in the central portion thereof, is a cast-iron head-block 55 each end of which is provided with an integrally attached arm which projects at a right angle therefrom in a direction away from the saw 12, one of which arms is indicated by the numeral 56 in Fig. 3, and the other of which arms is indicated by the numeral 57 in Fig. 4, and these arms 56 and 57 are pivotally attached to integral parts of the movable frame 27 by pivot-bolts 58 and 59, respectively, whereby such head-block 55 may be swung upwardly and downwardly.

To the vertical face of the head-block 55 in the central portion of its length is pivotally attached, in a whiffletree-like manner, a cast-iron bar 60 of right angular cross-section by means of pivot bolts 61, as more clearly shown in Fig. 3, which cast-iron bar 60 is thus adapted to oscillate on its centrally located pivot bolt 61, and upon each end of such cast-iron bar 60 is provided a downwardly projecting lug, as the lug 62 in Fig. 3, within which lugs is journaled another spurred roller 63 whose axis is thus disposed to oscillate in a plane that is parallel with the plane of the saw 12, and such spurred roller 63 constitutes the other one of the rotatable gripping jaws by which a shingle bolt is gripped and carried, step by step, toward the saw 12.

As shown in Figs. 1 and 4, an end portion of the shaft 64 of the spurred roller 63 projects beyond the vertical side rail of the movable frame 27, and securely mounted thereon is a worm-gear 65 which meshes with a worm-screw 66 that is securely mounted on one end portion of a shaft 67 which is disposed to be rotatable in a bearing 68 attached to the adjacent end portion of the cast-iron bar 60, the other end portion of such shaft 67 being connected by a universal joint 69 and a pawl and ratchet mechanism 70 with a gearwheel 71 which is securely mounted on a shaft journaled in a socket 72 that is integral with a bracket 73 which is attached to the vertical side rail of the movable frame 27, as more clearly shown in Fig. 4, such shaft being secured in the socket 72 by a washer 74 and a screw-bolt 75.

The pawl and ratchet mechanism 70 is similar in construction and mode of operation to the pawl and ratchet mechanism composed of the parts 46, 47, 48 and 8 which are associated with the worm-screw 43 on the lower portion of the movable frame 27, and, obviously, a rotation of the gearwheel 71 in one direction will rotate the worm-screw 66 while its rotation in an opposite direction will have no effect on such worm-screw 66, and the universal joint 69 serves to permit the operation of rotating the spurred roller 63 to move a shingle bolt toward the saw 12 irrespective of slight changes in the vertical position of the head-block 55 and an oscillating movement of the cast-iron bar 60.

Attached to the central portion of the upper side of the cast-iron bar 60 is a suspending link 76 whose upper end portion is loosely articulated with a lever 77 by which lever 77 the head-block 55 together with its associated parts may be raised and lowered to permit a shingle bolt to be disposed within the grip of the spurred rollers 41 and 63 and to be released therefrom, the said lever 77 being pivotally attached by a pivot bolt 78 to the top rail of the movable frame 27 at a point which is at a short distance from the suspending link 76 and such lever 77 is formed to extend obliquely upward from said pivot bolt 78 to a plane higher than the top of the cast-iron frame 9, thence to extend its end portion in a direction away from the saw 12 in a vertical plane parallel therewith for a suitable distance to afford proper leverage with which to actuate the head-block 55 through the medium of the link 76 and to such end portion is articulated the upper end of a vertically disposed connecting rod 79 whose lower end is articulated with the free end of a foot lever 80 whose other end is pivotally attached to a leg of the frame 10 whereby one's foot may depress the foot lever 80 to actuate the lever 77 to raise the head-block 55 together with the spurred roller 63, and when one's foot is removed from the foot lever 80 then a heavy disk 81 of cast-iron, which is adjustably mounted on the other end portion of the lever 77, which extends from the link 76 toward the saw 12, will act to move downwardly the head-block 55 and its associated spurred roller 63 to grip a shingle bolt.

Integral with the head-block 55 and adjacent to the arm 56 thereof is a projecting portion 82 which extends over the top of an end portion of the cast-iron bar 60 and between the under surface of such projecting portion 82 and the top surface of such end portion of the cast-iron bar 60 is disposed a helical spring 83 which serves to counteract the weight of the worm-screw 66, the worm-gear 65 and their associated parts, which are carried on the opposite end of the cast-iron bar 60, thus more evenly to balance such cast-iron bar 60 on the pivot-bolt 61.

Extending backwardly from the underside of the top rail of the movable frame 27 at a point between the link 76 and the vertical side rail of such movable frame 27, is an integral projection 84 which serves to limit the downward movement of the lever 77 whereby the head-block 55 may be limited in its downward movement.

The movable frame 27 is provided with two horizontally disposed rods 85 and 86 which are adapted to be slidably movable endwise with respect to said movable frame 27, the rod 85 being slidably disposed in guide brackets 87 and 88 while the rod 86 is slidably disposed in guide brackets 89 and 90, as more clearly shown in Fig. 1, and associated with the brackets 87 and 89 are resilient friction devices 91 and 92, respectively, which serve to engage with the surfaces of the rods 85 and 86, respectively, whereby such rods normally may be maintained in a fixed position with relation to the movable frame 27.

One end portion of the rod 85 is disposed to extend outwardly from the vertical side rail of the movable frame 27 and the underside of such end portion is provided with a series of teeth 93 which are disposed to mesh with the teeth of the gearwheel 71 whereby an endwise movement of such rod 85 may rotate said gearwheel 71; and one end portion of the rod 86 is disposed to extend outwardly beyond the end of the bottom rail of the movable frame 27 beneath the gearwheel 54 and such end portion on its side is provided with a series of teeth 94, which teeth 94 are disposed to mesh with the teeth of said gearwheel 54 whereby said rod 86, by its movement, may communicate rotary motion to said gearwheel 54.

Secured in brackets 95 and 96 of the frame 9 at the left hand end thereof are studs 97 and 98, respectively, the stud 97 serving to engage and limit an endwise movement of rod 85 in one direction while the stud 98 in a like manner serves to limit an endwise movement of the rod 86 in the same direction.

The frame 9 on the front side of its right hand end, as shown in Fig. 1, is provided with guide brackets 99 and 100 within which is disposed a slide-bar 101 which is adapted to be movable in a vertical plane and such slide-bar 101 is provided with adjustable limit studs 102, 103, 104 and 105, which are so disposed that when the slide-bar 101 is in its highest position the limit stud 103 may engage with the adjacent end of the rod 85 while the limit stud 105 may engage with the adjacent end of the rod 86, and when the slide-bar 101 is in its lowest position then the limit stud 102 may engage with the rod 85, while the limit stud 104 may engage with the rod 86, all of such engagements taking place when the movable frame 27 is moved a sufficient distance toward such slide-bar 101 in response to the rotation of the gearwheel 17 acting through crank-pin 18, rod 21 and connecting rod 24.

The slide-bar 101 is moved up and down between its highest position and its lowest position at required different instant of time by the intermittent action of a rotatable cam-plate 106 which is mounted securely on a sleeve 107 together with a ratchet wheel 108 to which sleeve 107 said cam-plate 106 and ratchet wheel 108 is secured by a key 109 and a screw-threaded collar 110, the sleeve 107 being rotatably disposed on a pivot-bolt 111 which is fixed in a lug 112 that projects upwardly from the upper right hand corner of the frame 9 whereby such pivot-bolt 111 is in line with the vertical axis of the slide-bar 101 and such slide-bar 101 at its upper end is provided with an extension member 113 which is provided with an oblong opening 114 through its central portion through which opening extends the sleeve 107 and the hub of the ratchet wheel 108, and on the upper end of such extension member 113 is mounted a roller 115 which is disposed to rotate on a pivot-bolt 116 and such roller 115 is adapted to engage with the cam-plate 106 whereby upon a rotation of such cam-plate 106 the slide-bar 101 will be actuated in an obvious manner. The sleeve 107 also serves as a pivotal support for one end of a lever 117 whose other end is provided with a slot 118 within which is movably disposed a stud 119 which serves to articulate the upper end of a connecting rod 120 whose lower end is pivotally attached to the upper right hand corner of the movable frame 27, as more clearly shown in Fig. 1, whereby such lever 117 shall oscillate in response to the reciprocal movements of the movable frame 27, and pivotally attached to the lever is a pawl 121 which is adapted to engage with the teeth of the ratchet wheel 108 to rotate such ratchet wheel 108, step by step, in response to the oscillation of the lever 117 due to reciprocal movements of the movable frame 27.

The free end of the pawl 121 is provided with a projecting pin 122 which is adapted to engage with a cam-lever 123 which is pivoted to the frame 9 by a pivot-stud 124, such cam-lever 123 being provided with an extended portion 125 which projects toward the left hand (as shown more clearly in Fig. 6) to pivotally connect with a connecting rod 126 which connecting rod 126 extends downwardly and at its lower end is articulated with one end of a pivotally supported foot lever 127 (as indicated by dotted lines in Fig. 1) whereby said cam-lever 123 may be actuated to raise the pawl 121 out of engagement with the teeth of the ratchet wheel 108 thus to arrest the rotary movement of the ratchet wheel 108 and the cam-plate 106 independently of the continued oscillation of the lever 117.

In order that no unauthorized person may alter the adjustment of the adjustable limit studs 102, 103, 104 and 105 I have made the check-nut, which hold them in a desired fixed position, inaccessible to such unauthorized persons by means illustrated in Fig. 5, wherein a metal shield 129 is secured to the side bar 101, by means of a staple 130 and a pad-lock 131, in such position that its inwardly turned sides may cover and protect the check-nuts to make them inaccessible to a wrench, such inwardly turned sides being provided with slots through which the shanks of the limit studs 102 and 103 may pass, as indicated.

In Fig. 1 I have shown the staples 130 but have not shown therein the metal shield 129 nor the pad-lock 131.

Manifestly other forms of locking means may be employed for preventing unauthorized persons from getting access to such check-nuts.

The mode of operation of my shingle sawing machine may be described as follows: Rotary motion is communicated to the saw 12 and the foot-lever 80 is depressed to raise the head-block 55 to insert a shingle-bolt between the spurred wheels 41 and 63 whereby upon releasing the foot-lever 80 the end surfaces of such shingle-bolt will be gripped securely by the numerous spurs of the spurred rollers 41 and 63 in response to the weight of the heavy disk 81 acting on the head-block 55 through the lever 77 and the link 76, then rotary motion is communicated to the gearwheel 17 which acting through the rod 21 and connecting rod 24 causes the movable frame 27 to move toward the saw 12 to saw off a slab from the shingle-bolt and to cause the left hand ends of the rods 85 and 86 to engage with the limit studs 97 and 98 to arrest the endwise movement of rods 85 and 86 and cause their opposite ends to project from the adjacent vertical side rail of the now moving frame 27 for such distance as will cause the teeth 93 of the rod 85 and the teeth 94 of the rod 86 to actuate respectively the gearwheels 71 and 54 to rotate the pawl and ratchet mechanism associated therewith without rotating the worm-screws 66 and 43 and a continuation of the rotation of the gearwheel 17, obviously, will reverse the direction of travel of the frame 27 to cause it to move toward the limit studs 102, 103, 104 and 105, thus to cause the limit stud 102 or the limit stud 103 to engage the toothed end of the rod 85 and the limit stud 104 or the limit stud 105 to engage the toothed end of the rod 86 according to the vertical position of the slide-bar 101, thus to arrest the endwise movement of the rods 85 and 86, respectively, whereby the continued movement of the frame 27 will act to cause the gearwheels 71 and 54, respectively, to communicate motions to the worm-screws 66 and 43, respectively, through said pawl and ratchet mechanism within the casings 70 and 48, respectively, whereby the spurred rollers 63 and 41 will be rotated to move the shingle-bolt toward the plane of the saw 12 for a distance that is determined by the action of the pawl 121 on the ratchet wheel 108 in response to the motion of the lever 118 and the connecting rod 120 which is actuated by the movement of the frame.

Normally the relation between the ratchet wheel 108, the cam-plate 106, the lever 117 and the roller 115 is such that continued reciprocal movements of the frame 27 will cause the top and bottom ends of the shingle-bolt each to move toward the plane of the saw, step by step, in such manner that the top ends of the successive shingles that are sawed from the shingle-bolt will be alternately thick and thin whereby the shingle-bolt will be evenly consumed.

Obviously, the feeding mechanism may be arrested in its operation by depressing the foot-lever 127 to throw the pawl 121 out of engagement with the teeth of the ratchet wheel 108.

Manifestly, numerous changes may be made in the form of construction and arrangement of parts of my invention without departing from the spirit thereof.

What I claim is:

1. A shingle sawing machine embodying rotatable spurred gripping jaws, a worm-gearwheel securely attached to one end of each of said gripping jaws to be rotatable therewith, two rotatable worm-screws each disposed to engage with a different one of said worm-gearwheels, a slidably movable frame carrying said gripping jaws, said worm-gearwheels and said worm-screws to be carried thereby and operative mechanism associated with said slidably movable frame adapted to communicate intermittent rotary movement of different speeds to each of said worm-screws in response to reciprocatory movements of said slidably movable frame.

2. A shingle sawing machine including a frame, a shingle-bolt supporting frame slidably mounted thereon, bolt-gripping rollers journaled in said supporting frame, means carried by the supporting frame and shiftable in a direction parallel to the line of travel of said frame for revolving said gripping rollers, and means supported on the main frame adapted to engage the aforesaid means to return the same to initial position.

3. A shingle sawing machine including a frame, a shingle-bolt supporting frame slidably mounted thereon, bolt-gripping rollers carried by the supporting frame, means movable longitudinally of the supporting frame for revolving said rollers, and vertically movable means operated by movement of the supporting frame adapted to engage the aforesaid means to restore the same to initial position.

4. A shingle sawing machine including a frame, a shingle-bolt supporting frame movably mounted thereon, clamping rollers journaled therein, means movable in a direction parallel to the movement of the supporting frame adapted to revolve said rollers, and means moving in a direction at right angles to the movement of said frame adapted to engage the aforesaid means to restore the same to initial position.

In witness whereof, I, hereunto subscribe my name this 23rd day of November A. D., 1914.

THOMAS S. GARRETT.

Witnesses:
F. C. MATHENY,
O. JOHNSON.

Copies of this patent may be obtained for five cents each, by addressing the "Commissioner of Patents, Washington, D. C."